US010730365B2

(12) United States Patent
Rice

(10) Patent No.: US 10,730,365 B2
(45) Date of Patent: Aug. 4, 2020

(54) SYSTEMS AND METHODS FOR COOLING VEHICLE SYSTEMS OF AN AUTONOMOUS VEHICLE

(71) Applicant: UATC, LLC, San Francisco, CA (US)

(72) Inventor: David Patrick Rice, Wexford, PA (US)

(73) Assignee: UATC, LLC, San Francisco, CA (US)

( * ) Notice: Subject to any disclaimer, the term of this patent is extended or adjusted under 35 U.S.C. 154(b) by 263 days.

(21) Appl. No.: 15/804,386

(22) Filed: Nov. 6, 2017

(65) Prior Publication Data

US 2019/0105968 A1 Apr. 11, 2019

Related U.S. Application Data

(60) Provisional application No. 62/568,839, filed on Oct. 6, 2017.

(51) Int. Cl.

*B60K 1/00* (2006.01)
*B60H 1/32* (2006.01)
*B60K 11/02* (2006.01)
*B60L 58/26* (2019.01)
*B60K 1/04* (2019.01)
*G05D 1/00* (2006.01)
*B60H 1/00* (2006.01)

(52) U.S. Cl.

CPC ............. *B60H 1/3205* (2013.01); *B60K 1/00* (2013.01); *B60K 1/04* (2013.01); *B60K 11/02* (2013.01); *B60L 58/26* (2019.02); *B60H 1/00278* (2013.01); *B60H 2001/3285* (2013.01); *B60K 2001/005* (2013.01); *B60Y 2200/90* (2013.01); *B60Y 2200/92* (2013.01); *B60Y 2400/30* (2013.01); *G05D 1/0088* (2013.01)

(58) Field of Classification Search

CPC .............. B60H 1/00278; B60H 1/3205; B60H 2001/3285; F25B 7/00; B60L 58/10; B60L 58/26; B60K 11/02

See application file for complete search history.

(56) References Cited

U.S. PATENT DOCUMENTS 9,219,295 B2 * 12/2015 Weng ...................... B60L 1/003
2008/0078542 A1 * 4/2008 Gering .............. B60H 1/00278 165/202
2017/0313158 A1 * 11/2017 Porras .............. H01M 10/6568

* cited by examiner

*Primary Examiner* — Edward F Landrum
*Assistant Examiner* — Daniel C Comings
(74) *Attorney, Agent, or Firm* — Dority & Manning, P.A.

(57) ABSTRACT

Systems and methods for providing cooling to vehicle systems on an autonomous vehicle from a plurality of cooling sources are provided. A cooling system can include a thermal interface configured to provide cooling to one or more vehicle systems of the autonomous vehicle, a plurality of cooling sources coupled to the thermal interface, and a controller configured to control each cooling source to provide a respective cooling to the thermal interface to meet a total cooling parameter for the one or more vehicle systems. Each cooling source can be configured to provide a respective cooling capacity to the thermal interface. The thermal interface can be configured to receive the respective cooling provided by each of the cooling sources. The thermal interface can be further configured to provide the respective cooling received by each of the cooling sources to the one or more vehicle systems to meet the total cooling parameter.

20 Claims, 6 Drawing Sheets

150
AV COMPUTING SYSTEM
102
212
211
THERMAL INTERFACE
210
INTEGRATED POWER ELECTRONICS COOLANT LOOP
220
INTEGRATED BATTERY COOLANT LOOP
230
INTERNAL RADIATOR
240
A/C COOLANT SYSTEM
250
OTHER COOLING SOURCE
260
CONTROLLER
270

SYSTEMS AND METHODS FOR COOLING VEHICLE SYSTEMS OF AN AUTONOMOUS VEHICLE

PRIORITY CLAIM

The present application is based on and claims priority to U.S. Provisional Application 62/568,839 having a filing date of Oct. 6, 2017, which is incorporated by reference herein.

FIELD

The present disclosure relates generally to cooling systems. More particularly, the present disclosure relates to systems and methods for providing cooling to vehicle systems on an autonomous vehicle from a plurality of cooling sources.

BACKGROUND

An autonomous vehicle is a vehicle that is capable of sensing its environment and navigating with minimal or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

In some implementations, an autonomous vehicle can include one or more vehicle systems which may be subject to one or more thermal constraints. For example, an autonomous vehicle can include a computing system configured to assist with autonomous operation, and the computing system can include processors, memory devices, or other components which may need to be operated at or below one or more temperature thresholds in order for the computing system to operate reliably. In some implementations, such a computing system may require a cooling system configured to remove heat from the computing system in order for the computing system to operate below any applicable temperature thresholds.

However, the cooling requirement for an autonomous vehicle may vary depending upon the type of systems installed (e.g., computing systems, power systems, energy storage systems, vehicle control systems, etc.), the operating conditions for the vehicle, or other factors. One approach to meeting the cooling requirements for an autonomous vehicle is to incorporate a stand-alone cooling system capable of providing the maximum amount of cooling required for all vehicle systems under all operating conditions. However such a cooling system may add unnecessary weight, occupy a large volume of space, and may be inefficient under some operating conditions.

SUMMARY

Aspects and advantages of embodiments of the present disclosure will be set forth in part in the following description, or can be learned from the description, or can be learned through practice of the embodiments.

One example aspect of the present disclosure is directed to a cooling system for an autonomous vehicle. The cooling system can include a thermal interface configured to provide cooling to one or more vehicle systems of the autonomous vehicle. The cooling system can further include a plurality of cooling sources coupled to the thermal interface. Each cooling source can be configured to provide a respective cooling capacity to the thermal interface. The cooling system can further include a controller configured to control each cooling source to provide a respective cooling to the thermal interface to meet a total cooling parameter for the one or more vehicle systems. The thermal interface can be configured to receive the respective cooling provided by each of the cooling sources. The thermal interface can be further configured to provide the respective cooling received by each of the cooling sources to the one or more vehicle systems to meet the total cooling parameter.

Another example aspect of the present disclosure is directed to a method of providing cooling to one or more vehicle systems of an autonomous vehicle. The method can include determining, by a controller comprising one or more processors, a total cooling parameter for the one or more vehicle systems based at least in part on one or more operational parameters. The method can further include determining, by the controller, a cooling scheme for a cooling system comprising a plurality of cooling sources and a thermal interface based at least in part on the total cooling parameter. The method can further include controlling, by the controller, the plurality of cooling sources to provide cooling to the thermal interface and the one or more vehicle systems based at least in part on the cooling scheme.

Another example aspect of the present disclosure is directed to an autonomous vehicle. The autonomous vehicle can include one or more vehicle systems and a cooling system. The cooling system can include a thermal interface configured to provide cooling to the one or more vehicle systems. The thermal interface can include a plurality of heat exchangers. The cooling system can further include a plurality of cooling sources. Each cooling source can be coupled to a respective heat exchanger of the thermal interface. Each cooling source can be configured to provide a respective cooling capacity to the thermal interface. The cooling system can further include a controller comprising one or more processors and one or more memory devices, the one or more memory devices storing instructions that when executed by the one or more processors cause the controller to perform operations. The operations can include determining a total cooling parameter for the one or more vehicle systems based at least in part on one or more operational parameters. The operations can further include determining a cooling scheme for the plurality of cooling sources based at least in part on the total cooling parameter. The operations can further include controlling the plurality of cooling sources to provide cooling to the thermal interface based at least in part on the cooling scheme. The one or more vehicle systems can include one or more of: a vehicle computing system, a power conversion system, and an energy storage system. The plurality of cooling sources can include a plurality of: an integrated power electronics coolant loop, an integrated battery coolant loop, an internal radiator coolant loop, and an air-conditioning coolant system.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
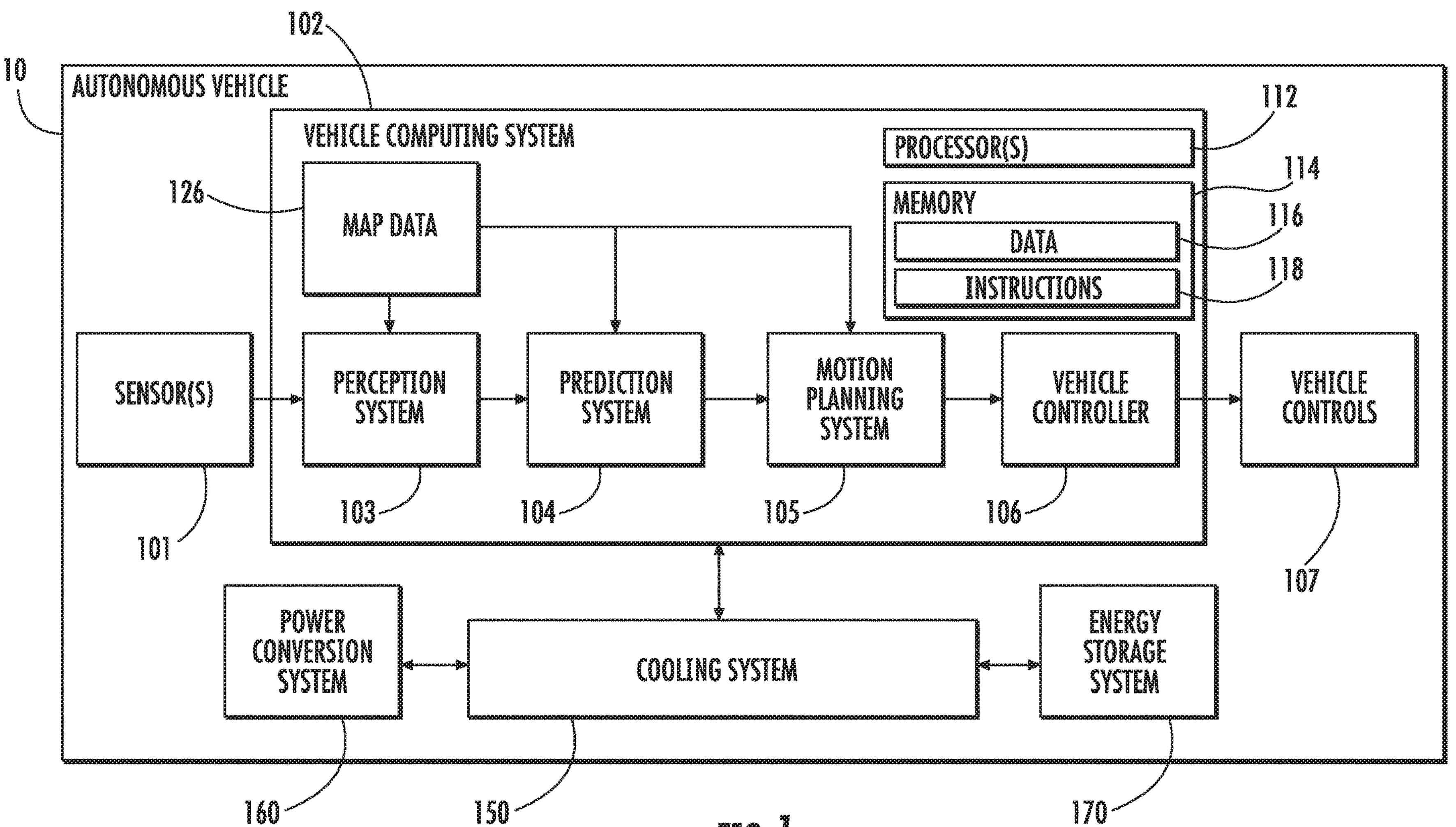
FIG. 1 depicts a block diagram of an example autonomous vehicle according to example aspects of the present disclosure.

Example aspects of the present disclosure are directed to system and methods for providing cooling to one or more vehicle systems of an autonomous vehicle by utilizing a plurality of cooling sources. For example, a cooling system can include a thermal interface configured to provide cooling to the one or more vehicle systems from a plurality of cooling sources coupled (directly or indirectly) to the thermal interface. The one or more vehicle systems can be, for example, a vehicle computing system (e.g., one or more of its systems), a power conversion system (e.g., power converter(s)), an energy storage system (e.g., batteries), or other system of an autonomous vehicle. Each cooling source can be configured to provide a respective cooling capacity to the thermal interface. For example, the thermal interface can include a plurality of heat exchangers, and each cooling source can be coupled to a respective heat exchanger to allow the thermal interface to receive cooling from each respective cooling source. The cooling system can further include a controller configured to control each of the cooling sources to provide a respective cooling to the thermal interface to meet a total cooling parameter for the one or more vehicle systems. The thermal interface can be configured to receive the respective cooling provided by each of the cooling sources and further provide cooling to the one or more vehicle systems to meet the total cooling parameter.

The controller can be configured to determine the total cooling parameter for the one or more vehicle systems based at least in part on one or more operational parameters. For example, in some implementations, the one or more operational parameters can include an energy usage for the one or more vehicle systems, an ambient temperature external to the autonomous vehicle, an operating temperature for the one or more vehicle systems, an inlet and/or outlet temperature of coolant from one or more cooling sources, and/or an inlet and/or outlet temperature of coolant provided to the one or more vehicle systems. The total cooling parameter can be, for example, an amount of cooling required to operate the one or more vehicle systems without exceeding a thermal constraint, such as an operating temperature threshold. For example, in some implementations, the total cooling parameter can be expressed in Watts or Watts at a particular temperature (e.g., degrees C. or F.). In some implementations, the total cooling parameter can be expressed as a temperature, such as an operating temperature or a coolant temperature setpoint. The controller can be configured to determine the cooling scheme for the cooling system based at least in part on the total cooling parameter. For example, the controller can determine which cooling sources from the plurality of cooling sources will provide cooling to meet the total cooling parameter, as well as how much cooling each cooling source is to provide (e.g., Watts of cooling or an operational setpoint). In some implementations, the controller can determine the cooling scheme based at least in part on an energy efficiency for one or more of the cooling sources and/or an expected service life for one or more of the cooling sources or vehicle systems. The controller can then control the plurality of cooling sources based at least in part on the cooling scheme to cool the one or more vehicle systems.

More particularly, in some implementations, an autonomous vehicle can include one or more vehicle systems that operate optimally when cooled. For example, an autonomous vehicle can include a vehicle computing system that assists in controlling the autonomous vehicle. The autonomous vehicle can be a ground-based autonomous vehicle (e.g., car, truck, bus, etc.), an air-based autonomous vehicle (e.g., airplane, drone, helicopter, or other aircraft), or other types of vehicles (e.g., watercraft). In some implementations, the vehicle computing system can include a vehicle autonomy system which includes one or more subsystems. For example, the vehicle autonomy system can include a perception system, a prediction system, and a motion planning system that cooperate to perceive the surrounding environment of the autonomous vehicle and determine a motion plan for controlling the motion of the autonomous vehicle accordingly. For example, one or more sensors of the autonomous vehicle can obtain sensor data associated with one or more objects within the surrounding environment of the autonomous vehicle. The perception system can receive the sensor data and generate state data descriptive of the one or more objects, such as data describing the position, velocity, heading, acceleration, size, type, etc. for each object. The perception system can provide the state data indicative of the one or more objects to the prediction system, which can determine a predicted future state for each object perceived by the perception system. The motion planning system can determine a motion plan for the autonomous vehicle based on the objects within the surrounding environment, the predicted future states for the objects, and characteristics of the area in which the vehicle is travelling. A vehicle controller can control the motion of the autonomous vehicle based on the motion plan. In this way, an autonomous vehicle can perceive objects within a surrounding environment of autonomous vehicle, and, in response, control the autonomous vehicle accordingly.

Additionally, in some implementations, an autonomous vehicle can include additional vehicle systems in order to allow the autonomous vehicle to operate autonomously. For example, an energy storage system can include one or more energy storage devices, such as batteries, capacitors, or other energy storage devices, which can be used to store energy which can be used by the vehicle computing system, vehicle control systems (e.g., actuators, etc.), or other vehicle systems to power the systems and components of the autonomous vehicle. In some implementations, a power conversion system can include one or more power converters (e.g., AC to DC, DC to DC, or DC to AC power converters), which can be used to convert power generated by the autonomous vehicle (e.g., via an alternator) or power stored in an energy storage device (e.g., a battery) from one type of power to another (e.g., AC to DC) or from a first voltage to a second voltage (e.g., 12V DC to 5 V DC).

In some implementations, one or more vehicle systems of an autonomous vehicle may be subject to one or more thermal constraints. For example, the vehicle computing system can include one or more processors, one or more memory devices, or other components which must be operated below one or more temperature thresholds in order for the component to operate safely and reliably without damaging the component. Similarly, one or more batteries may need to be operated below one or more temperature thresholds in order to operate efficiently, safely, and reliably, or one or more power converters may need to be operated below one or more temperature thresholds in order to prevent damage to the power converter. For example, operating a vehicle computing system at too high of a temperature may reduce the expected service life of the computing system or permanently damage the computing system.

According to example aspects of the present disclosure, a cooling system for an autonomous vehicle can be configured to provide cooling to one or more vehicle systems of the autonomous vehicle (e.g., the vehicle computing system, power conversion system, or energy storage system). For example, in some implementations, the cooling system can be a liquid cooling system, and a liquid coolant can be circulated to one or more vehicle systems of the autonomous vehicle to provide cooling to the one or more vehicle systems. For example, the cooling system can be configured to cool a liquid coolant, circulate the cooled liquid coolant to the one or more vehicle systems, and remove heat from the one or more vehicle systems via the liquid coolant. The warmed coolant can then be recirculated through the cooling system, where one or more cooling sources can cool the liquid coolant sufficiently for the liquid coolant to provide additional cooling to the one or more vehicle systems.

The cooling system can include a thermal interface configured to provide cooling to the one or more vehicle systems. A plurality of cooling sources can be coupled to the thermal interface (e.g., directly coupled or indirectly coupled), and each cooling source can be configured to provide a respective cooling capacity to the thermal interface. For example, in some implementations, the thermal interface can include a plurality of heat exchangers. In some implementations, the heat exchangers can be plate heat exchangers, such as welded, fused, or brazed plate heat exchangers. Each cooling source can be coupled to a respective heat exchanger in the thermal interface. For example, the thermal interface can include a plurality of heat exchangers coupled in series, wherein a liquid coolant is circulated through each of the heat exchangers in the thermal interface to receive cooling from one or more cooling sources before being circulated to the one or more vehicle systems. Each respective cooling source can be configured to provide a separate source of cooling to the thermal interface by, for example, circulating a cooled fluid (e.g., liquid coolant, expanded gas coolant) through a first portion of a respective heat exchanger (e.g., a plate heat exchanger), while a second cooled fluid (e.g., liquid coolant) is circulated through a second portion of the respective heat exchanger to receive cooling from the cooling source. Thus, a plurality of cooling sources can each provide a separate, incremental cooling capacity in order to meet a total cooling parameter for the one or more vehicle systems.

The cooling system can further include a controller configured to control each cooling source to meet the total cooling parameter for the one or more vehicle systems. For example, as will be described in greater detail herein, the controller can be configured to control each cooling source to provide a respective cooling to the thermal interface. In some implementations, the controller can select which cooling sources are used to provide cooling to the thermal interface, and further, can control the amount of cooling provided by the cooling sources.

The plurality of cooling sources can include a variety of different cooling sources, which can be configured on a platform or application-specific basis. For example, different vehicle manufacturers (i.e., original equipment manufacturers or "OEMs") can integrate or otherwise include different subsystems in a vehicle, which can be adapted for use by the autonomous vehicle. For example, different OEMs may include integrated power electronics coolant loops, integrated battery coolant loops, air-conditioning coolant systems, internal radiator systems, or other cooling systems in order to provide desired functionality for a particular vehicle. For example, some OEMs may configure or otherwise include different cooling sources based on a vehicle trim level, vehicle type, or other consideration. The systems and methods according to example aspects of the present disclosure can allow for a variety of different cooling sources to be used to meet a total cooling parameter for one or more vehicle systems of an autonomous vehicle.

For example, in some implementations, the plurality of cooling sources can include an integrated power electronics coolant loop configured to provide cooling to one or more power electronic devices of the autonomous vehicle. For example, an OEM can include a coolant loop to cool one or more power electronic devices on an autonomous vehicle. According to example aspects of the present disclosure, the integrated power electronics coolant loop can be coupled to a thermal interface of a cooling system (e.g., coupled to a heat exchanger of the thermal interface) to allow for the integrated power electronics coolant loop to provide a cooling capacity to the thermal interface. For example, in some implementations, the integrated power electronics coolant loop can include a bypass valve, which can be operated to allow the coolant flowing through the integrated power electronics coolant loop to be circulated through the thermal interface to provide cooling to the thermal interface. The controller can be configured to control operation of the bypass valve in order to allow for the integrated power electronics coolant loop to provide cooling to thermal interface.

In some implementations, the plurality of cooling sources can include an integrated battery coolant loop configured to provide cooling to one or more batteries of the autonomous vehicle. For example, in some implementations, an autonomous vehicle can be an electric or hybrid-electric vehicle, which can include one or more batteries in a battery bank configured to provide power to one or more electric motors of the vehicle. In some implementations, in order for the batteries to be operated within safe and efficient temperature range, an integrated battery coolant loop can be configured to provide cooling to the one or more batteries. According to example aspects of the present disclosure, the integrated battery coolant loop can similarly be coupled to the thermal interface of the cooling system (e.g., coupled to a heat exchanger of the thermal interface) to allow for the integrated battery coolant loop to provide a cooling capacity to the thermal interface. For example, in some implementations, the integrated battery coolant loop can include a bypass valve, which can be operated to allow the coolant flowing through the integrated battery coolant loop to be circulated through the thermal interface to provide cooling to the thermal interface. The controller can be configured to control operation of the bypass valve in order to allow for the integrated battery coolant loop to provide cooling to thermal interface.

In some implementations, the plurality of cooling sources can include an internal radiator coolant loop. For example, the internal radiator coolant loop can be a stand-alone or separate coolant loop configured to provide cooling to the thermal interface. In some implementations, the internal radiator coolant loop can be configured to provide cooling to additional systems or components, while in other implementations, the internal radiator loop can be configured to provide cooling solely to the thermal interface. In some implementations, the internal radiator coolant loop can include one or more coolant loops configured to circulate a coolant, a pump configured to circulate the coolant through the one or more coolant loops, and a fan configured to provide an airflow to the one or more coolant loops to remove heat from the coolant. For example, in some implementations, the one or more coolant loops can include a plurality of fins, and heat in the coolant can transfer from the coolant loops to the fins to ambient air. In some implementations, heat can be transferred from the coolant to the ambient air passively (e.g., via a heatsink), while in other implementations, an airflow can be provided by the fan to provide additional cooling. According to example aspects of the present disclosure, the internal radiator coolant loop can be coupled to the thermal interface of the cooling system (e.g., coupled to a heat exchanger of the thermal interface) to allow for the internal radiator coolant loop to provide a cooling capacity to the thermal interface. For example, the pump can circulate the internal radiator coolant through one side of a heat exchanger to allow heat to be removed from a coolant flowing through the thermal interface through a second side of the heat exchanger. The warmed internal radiator coolant can then be circulated through the one or more coolant loops where a fan can provide a cooling air flow to remove heat from the internal radiator coolant. The controller can be configured to control operation of the pump and fan to allow for the integrated power electronics coolant loop to provide cooling to thermal interface.

In some implementations, the plurality of cooling sources can include an air-conditioning coolant system configured to provide a cooled air flow to a cabin of the autonomous vehicle. For example, an OEM can include an air-conditioning system on a vehicle in order to regulate the temperature inside of the cabin of a vehicle for passenger comfort. The air-conditioning system can be, for example, a refrigeration cycle style air-conditioning system, which can include a condensing coil, an expansion valve, an evaporator coil, and a compressor. According to example aspects of the present disclosure, the air conditioning coolant system can be coupled to the thermal interface of the cooling system (e.g., coupled to a heat exchanger of the thermal interface) to allow for the air-conditioning coolant system to provide a cooling capacity to the thermal interface. For example, in some implementations, the air-conditioning coolant system can include an expansion valve coupled to the thermal interface, which can be operated to allow a pressurized liquid of the air-conditioning coolant system to expand into a cooled vapor that circulates through one side of a heat exchanger to allow heat to be removed from a coolant flowing through the thermal interface through a second side of the heat exchanger. The warmed vapor can then be circulated through the air-conditioning coolant system (i.e. through the compressor) to re-pressurize the liquid to allow for further cooling to be provided. The controller can be configured to control operation of the expansion valve (and other air-conditioning coolant system components) in order to allow for the air-conditioning coolant system to provide cooling to thermal interface.

In some implementations, the air-conditioning coolant system can be configured to provide a respective cooling to the thermal interface up to a threshold cooling capacity. For example, the threshold cooling capacity can be a supplemental cooling capacity of the air-conditioning coolant system after a cabin cooling requirement has been met by the air-conditioning coolant system. The cabin cooling requirement can be, for example, an amount of cooling needed to sufficiently cool the cabin of the vehicle (e.g., an amount cooling required to hold the temperature of the cabin at a particular setpoint). For example, the air-conditioning coolant system can be sized to provide sufficient cooling to the cabin of the vehicle in a variety of operating conditions and temperatures. Thus, in some operating conditions, the air-conditioning coolant system may have excess or supplemental cooling capacity after meeting the cabin cooling requirement. In some implementations, the controller can control the air-conditioning coolant system to provide cooling to the thermal interface up to the threshold cooling capacity. For example, the air-conditioning coolant system can be controlled to only provide cooling to the thermal interface up to the threshold cooling capacity.

In some implementations, the controller can be configured to reduce the cabin cooling requirement in order to increase the threshold cooling capacity. For example, in certain situations, the total cooling parameter for the one or more vehicle systems may not be able to be met by the plurality of cooling sources with the air-conditioning coolant system only providing cooling up to the threshold cooling capacity. For example, due to high ambient temperatures outside the vehicle, high operating temperatures of the one or more vehicle systems, or the unavailability of one or more of the cooling sources (e.g., due to operational issues), the cooling system may be unable to meet the total cooling parameter of the one or more vehicle systems with the air-conditioning coolant system only providing cooling up to the threshold cooling capacity. In such a situation, the controller can be configured to reduce the cabin cooling requirement in order to allow for an increased threshold cooling capacity to be provided to the thermal interface. For example, the controller can communicate with the air-conditioning coolant system in order to reduce the cooling provided to the cabin of the vehicle (e.g., adjusting a temperature setpoint on a temporary basis) in order to allow for additional cooling to be provided to the one or more vehicle systems.

In various other implementations, additional cooling sources can be configured to provide a respective cooling capacity to the thermal interface. For example, other stand-alone cooling sources can be coupled to a heat exchanger of the thermal interface, and can be controlled to provide a cooling capacity to the thermal interface.

According to additional aspects of the present disclosure, a method of providing cooling to one or more vehicle systems can include first determining a total cooling parameter for the one or more vehicle systems based at least in part on one or more operational parameters by a controller. The controller can include, for example, one or more processors and one or more memory devices, and can be configured to receive signals, measurements, and/or data indicative of the one or more operational parameters. For example, the one or more operational parameters can include an energy usage of the one or more vehicle systems (e.g., a power consumption of the one or more vehicle systems), an ambient temperature external to the autonomous vehicle, an operating temperature for the one or more vehicle systems, an inlet and/or outlet temperature of coolant from one or more cooling sources, and/or an inlet and/or outlet temperature of coolant provided to the one or more vehicle systems. As used herein, the term "inlet temperature" refers to the temperature of a coolant prior to being cooled by a cooling source or prior to providing cooling to a vehicle system. As used herein, the term "outlet temperature" refers to the temperature of a coolant after being cooled by a cooling source or after providing cooling to the vehicle system. The controller can be configured to determine the total cooling parameter for the one or more vehicle systems by, for example, determining the amount of cooling needed to operate the vehicle systems below a threshold temperature (e.g., Watts of cooling), determining a desired outlet temperature of coolant provided to the one or more vehicle systems, or determining a desired operational temperature of the one or more vehicle systems. For example, in some implementations, the controller can determine a total amount of Watts of cooling to be provided by the cooling system, while in other implementations, the controller can increase or decrease the amount of cooling provided by the cooling system based on the operational temperature of the one or more vehicle systems or an outlet temperature of coolant provided to the one or more vehicle systems (e.g., iteratively).

The method can further include determining a cooling scheme for the cooling system based at least in part on the total cooling parameter. For example, in some implementations the cooling scheme can be indicative of which cooling sources are to provide cooling and/or an amount of cooling to be provided by each respective cooling source. For example, a cooling scheme can indicate that an internal radiator coolant loop should be operated at a first setpoint (e.g., expressed in Watts, percentage, power level, power factor, or other setpoint), while an air-conditioning coolant system should be operated at a second setpoint (e.g., expressed in Watts, percentage, power level, power factor, or other setpoint). In some implementations, the cooling scheme can be determined via a feedback loop, such as on an iterative basis. For example, a temperature measurement can indicate that more or less cooling is needed, and an incremental increase or decrease in a cooling source can be provided to meet the total cooling parameter. In some implementations, the cooling scheme can be determined via a lookup table, such as by looking up which cooling sources to use and/or amounts of cooling to provide at a particular temperature, energy usage, or other operational parameter.

The method can further include controlling the plurality of cooling sources to provide cooling to the one or more vehicle systems based at least in part on the cooling scheme. For example, the controller can be configured to operate or otherwise control a bypass valve, expansion valve, pump, fan, or other component of a cooling source in order to cause the cooling source to provide a cooling capacity to the thermal interface. Further, the controller can be configured to control the amount of cooling provided by a cooling source. For example, the controller can be configured to control how fast a pump circulates coolant through the thermal interface and/or through a cooling source, how fast a fan blows, how far open a bypass valve or expansion valve is opened, and/or perform any other control action needed to control a cooling source to provide cooling and/or a cooling amount.

In some implementations, the controller can be configured to determine the cooling scheme based at least in part on an energy efficiency of one or more of the cooling sources. For example, in some implementations, a cost and/or efficiency function can be used to express the relative cost and/or efficiency of providing cooling from a particular cooling source (e.g., X dollars per watt at Y degrees C.). In some implementations, the controller can be configured to determine the cooling scheme in order to increase an overall efficiency, maximize an overall efficiency, reduce an expense, or minimize an expense of a cooling system to meet a total cooling parameter. For example, in some implementations, an air-conditioning coolant system may have a higher efficiency (e.g., less operational cost per unit of cooling, less waste per unit of cooling, etc.) than an integrated battery coolant loop. The controller can be configured to select the air-conditioning coolant system to provide cooling at a higher priority than the battery coolant loop to meet the total cooling parameter of the one or more vehicle systems.

In some implementations, the controller can be configured to determine the cooling scheme based at least in part on an expected service life for one or more of the cooling sources and/or the one or more vehicle systems. For example, in some implementations, a first cooling source may have a greater number of components, more expensive components, more easily worn out components, a lower mean-time before failure, and/or other expected service life variation as compared to a second cooling source. For example, an air-conditioning coolant system may have an increased number of components, an increased replacement cost, and/or a lower mean time between failures than an internal radiator coolant system. The controller can be configured to select the internal radiator coolant system at a higher priority than the air-conditioning coolant system to meet the total cooling parameter of the one or more vehicle systems. In some implementations, the controller can be configured to determine the cooling scheme in order to extend an expected service life of one or more of the cooling sources. For example, the controller can be configured to select a particular cooling source at a lower priority in order to reduce the wear and tear on the cooling source, thereby increasing the expected service life of the cooling source.

Similarly, the one or more vehicle systems may have an expected service life that is dependent upon an operating temperature. The controller can be configured to control the plurality of cooling sources to provide cooling to the one or more vehicle systems in order to manage the operating temperature of the one or more vehicle systems. In this way, the controller can control the operating temperature to manage, and in particular, increase the expected service life of the one or more vehicle systems.

The systems and methods described herein may provide a number of technical effects and benefits. For example, the systems and methods according to example aspects of the present disclosure can allow for a plurality of cooling sources to be used to cool one or more vehicle systems of an autonomous vehicle. In particular, integrated cooling sources on a vehicle adapted for autonomous use can be incorporated into the cooling system along with other application-specific, separate, or additional cooling systems. Thus, the systems and methods according to example aspects of the present disclosure allow for increased flexibility and adaptability by allowing for any number of vehicles to be configured for autonomous use while providing sufficient cooling for one or more vehicle systems of the vehicle, such as vehicle systems used for autonomous operation.

Additionally, the systems and methods described herein can allow for increased reliability by providing a variety of cooling options to be used to sufficiently cool vehicle systems subject to thermal constraints, such as autonomous vehicle computing systems. For example, in certain operating conditions, one or more cooling sources may be unavailable due to, for example, equipment failure, temperature constraints, or other operating conditions. The cooling systems according to example aspects of the present disclosure can allow for other cooling sources in the cooling system to be used to meet the total cooling parameter of a vehicle system during such operating conditions. Further, by helping to ensure that vehicle systems of an autonomous vehicle operate reliably, passenger safety and convenience can be increased.

Additionally, the systems and methods according to example aspects of the present disclosure can allow for an increased efficiency of a cooling system. For example, the systems and methods disclosed herein can allow for less expensive or more efficient cooling sources to be prioritized to provide cooling to vehicle systems of an autonomous vehicle. This can allow for a reduced energy usage to provide sufficient cooling capacity for vehicle systems or components of the autonomous vehicle.

Further, the systems and methods disclosed herein can allow for managing the service life of vehicle systems and cooling sources by, for example, operating vehicle systems within preferred temperature ranges and/or operating a cooling source to increase an expected service life of the cooling source. For example, some vehicle systems of an autonomous vehicle, such as a power conversion system or a vehicle computing system, may have an expected mean time between failures that is dependent on an operating temperature. The systems and methods according to example aspects of the present disclosure can allow for the operating temperature of such vehicle systems to be controlled in order to manage, and in particular, extend, the service life of such vehicle systems. Further, some cooling sources may be more complex, more prone to failure, and/or have a higher replacement cost than other cooling sources. The systems and methods according to example aspects of the present disclosure can allow for cooling sources that are less complex, less prone to failure, and/or have a cheaper replacement cost to be prioritized to provide cooling to vehicle systems of the autonomous vehicle.

With reference now to the FIGS., example aspects of the present disclosure will be discussed in further detail. FIG. 1 depicts a block diagram of an example autonomous vehicle 10 according to example aspects of the present disclosure. The autonomous vehicle 10 can include one or more sensors 101, a vehicle computing system 102, and one or more vehicle controls 107. The vehicle computing system 102 can assist in controlling the autonomous vehicle 10. In particular, the vehicle computing system 102 can receive sensor data from the one or more sensors 101, attempt to comprehend the surrounding environment by performing various processing techniques on data collected by the sensors 101, and generate an appropriate motion path through such surrounding environment. The vehicle computing system 102 can control the one or more vehicle controls 107 to operate the autonomous vehicle 10 according to the motion path.

The vehicle computing system 102 can include one or more processors 112 and a memory 114. The one or more processors 112 can be any suitable processing device (e.g., a processor core, a microprocessor, an ASIC, a FPGA, a computing device, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which can be executed by the processor 112 to cause vehicle computing system 102 to perform operations.

As illustrated in FIG. 1, the vehicle computing system 102 can include a perception system 103, a prediction system 104, and a motion planning system 105 that cooperate to perceive the surrounding environment of the autonomous vehicle 10 and determine a motion plan for controlling the motion of the autonomous vehicle 10 accordingly. In some implementations, the perception system 103, the prediction system 104, the motion planning system 105 can be included in or otherwise a part of a vehicle autonomy system. As used herein, the term "vehicle autonomy system" refers to a system configured to control the movement of an autonomous vehicle.

In particular, in some implementations, the perception system 103 can receive sensor data from the one or more sensors 101 that are coupled to or otherwise included within the autonomous vehicle 10. As examples, the one or more sensors 101 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 10.

As one example, for a LIDAR system, the sensor data can include the location (e.g., in three-dimensional space relative to the LIDAR system) of a number of points that correspond to objects that have reflected a ranging laser. For example, a LIDAR system can measure distances by measuring the Time of Flight (TOF) that it takes a short laser pulse to travel from the sensor to an object and back, calculating the distance from the known speed of light.

As another example, for a RADAR system, the sensor data can include the location (e.g., in three-dimensional space relative to the RADAR system) of a number of points that correspond to objects that have reflected a ranging radio wave. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

As another example, the one or more sensors 101 can include a positioning system. The positioning system can determine a current position of the vehicle 10. The positioning system can be any device or circuitry for analyzing the position of the vehicle 10. For example, the positioning system can determine a position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle 10 can be used by various systems of the vehicle computing system 102.

Thus, the one or more sensors 101 can be used to collect sensor data that includes information that describes the location (e.g., in three-dimensional space relative to the autonomous vehicle 10) of points that correspond to objects within the surrounding environment of the autonomous vehicle 10. In some implementations, the sensors 101 can be located at various different locations on the autonomous vehicle 10. As an example, in some implementations, one or more cameras and/or LIDAR sensors can be located in a pod or other structure that is mounted on a roof of the autonomous vehicle 10 while one or more RADAR sensors can be located in or behind the front and/or rear bumper(s) or body panel(s) of the autonomous vehicle 10. As another example, camera(s) can be located at the front or rear bumper(s) of the vehicle 10 as well. Other locations can be used as well.

In addition to the sensor data, the perception system 103 can retrieve or otherwise obtain map data 126 that provides detailed information about the surrounding environment of the autonomous vehicle 10. The map data 126 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 102 in comprehending and perceiving its surrounding environment and its relationship thereto.

The perception system 103 can identify one or more objects that are proximate to the autonomous vehicle 10 based on sensor data received from the one or more sensors 101 and/or the map data 126. In particular, in some implementations, the perception system 103 can determine, for each object, state data that describes a current state of such object (also referred to as features of the object). As examples, the state data for each object can describe an estimate of the object's: current location (also referred to as position); current speed (also referred to as velocity); current acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the autonomous vehicle; minimum path to interaction with the autonomous vehicle; minimum time duration to interaction with the autonomous vehicle; and/or other state information.

In some implementations, the perception system 103 can determine state data for each object over a number of iterations. In particular, the perception system 103 can update the state data for each object at each iteration. Thus, the perception system 103 can detect and track objects (e.g., vehicles) that are proximate to the autonomous vehicle 10 over time.

The prediction system 104 can receive the state data from the perception system 103 and predict one or more future locations for each object based on such state data. For example, the prediction system 104 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The prediction system 104 can create prediction data associated with each of the respective one or more objects within the surrounding environment of the vehicle 10. The prediction data can be indicative of one or more predicted future locations of each respective object. For example, the prediction data can be indicative of a predicted trajectory (e.g., predicted path) of at least one object within the surrounding environment of the vehicle 10. For example, the predicted trajectory (e.g., path) can indicate a path along which the respective object is predicted to travel over time (and/or the speed at which the object is predicted to travel along the predicted path).

For example, in some implementations, the prediction system 104 can be a goal-oriented prediction system that generates one or more potential goals, selects one or more of the most likely potential goals, and develops one or more trajectories by which the object can achieve the one or more selected goals. For example, the prediction system 104 can include a scenario generation system that generates and/or scores the one or more goals for an object and a scenario development system that determines the one or more trajectories by which the object can achieve the goals. In some implementations, the prediction system 104 can include a machine-learned goal-scoring model, a machine-learned trajectory development model, and/or other machine-learned models.

In some implementations, the predictions system 104 can use state data indicative of an object type or classification to predict a trajectory for the object. As an example, the prediction system 104 can use state data provided by the perception system 103 to determine that particular object (e.g., an object classified as a vehicle) approaching an intersection and maneuvering into a left-turn lane intends to turn left. In such a situation, the prediction system 104 can predict a trajectory (e.g., path) corresponding to a left-turn for the vehicle such that the vehicle turns left at the intersection. Similarly, the prediction system 104 can determine predicted trajectories for other objects, such as bicycles, pedestrians, parked vehicles, etc. The prediction system 104 can provide the predicted trajectories associated with the object(s) to the motion planning system 105.

The motion planning system 105 can determine a motion plan for the autonomous vehicle 10 based at least in part on the predicted trajectories associated with the objects within the surrounding environment of the vehicle and/or the state data for the objects provided by the perception system 103. Stated differently, given information about the current locations of objects and/or predicted trajectories of objects within the surrounding environment of the autonomous vehicle 10, the motion planning system 105 can determine a motion plan for the autonomous vehicle 10 that best navigates the autonomous vehicle 10 relative to the objects at such locations and their predicted trajectories.

In some implementations, the motion planning system 105 can evaluate one or more cost functions and/or one or more reward functions for each of one or more candidate motion plans for the autonomous vehicle 10. For example, the cost function(s) can describe a cost (e.g., over time) of adhering to a particular candidate motion plan while the reward function(s) can describe a reward for adhering to the particular candidate motion plan. For example, the reward can be of opposite sign to the cost.

Thus, given information about the current locations and/or predicted future locations/trajectories of objects, the motion planning system 105 can determine a total cost (e.g., a sum of the cost(s) and/or reward(s) provided by the cost function(s) and/or reward function(s)) of adhering to a particular candidate pathway. The motion planning system 105 can select or determine a motion plan for the autonomous vehicle 10 based at least in part on the cost function(s) and the reward function(s). For example, the motion plan that minimizes the total cost can be selected or otherwise determined. The motion plan can be, for example, a path along which the autonomous vehicle 10 will travel in one or more forthcoming time periods. The motion planning system 105 can provide the selected motion plan to a vehicle controller 106 that controls one or more vehicle controls 107 (e.g., actuators or other devices that control gas flow, steering, braking, etc.) to execute the selected motion plan. In some implementations, the motion planning system 105 can be configured to iteratively update the motion plan for the autonomous vehicle 10 as new sensor data is obtained from one or more sensors 101. For example, as new sensor data is obtained from one or more sensors 101, the sensor data can be analyzed by the perception system 103, the prediction system 104, and the motion planning system 105 to determine the motion plan.

Each of the perception system 103, the prediction system 104, and the motion planning system 105 can be included in or otherwise a part of a vehicle autonomy system configured to determine a motion plan based at least in part on data obtained from one or more sensors 101. For example, data obtained by one or more sensors 101 can be analyzed by each of the perception system 103, the prediction system 104, and the motion planning system 105 in a consecutive fashion in order to develop the motion plan. While FIG. 1 depicts elements suitable for use in a vehicle autonomy system according to example aspects of the present disclosure, one of ordinary skill in the art will recognize that other vehicle autonomy systems can be configured to determine a motion plan for an autonomous vehicle based on sensor data.

Each of the perception system 103, the prediction system 104, the motion planning system 105, and the vehicle controller 106 can include computer logic utilized to provide desired functionality. In some implementations, each of the perception system 103, the prediction system 104, the motion planning system 105, and the vehicle controller 106 can be implemented in hardware, firmware, and/or software controlling a general purpose processor. For example, in some implementations, each of the perception system 103, the prediction system 104, the motion planning system 105, and the vehicle controller 106 includes program files stored on a storage device, loaded into a memory and executed by one or more processors. In other implementations, each of the perception system 103, the prediction system 104, the motion planning system 105, and the vehicle controller 106 includes one or more sets of computer-executable instructions that are stored in a tangible computer-readable storage medium such as RAM hard disk or optical or magnetic media.

The autonomous vehicle 10 can also include a cooling system 150 configured to provide cooling to one or more vehicle systems of the autonomous vehicle 10, as will be described in greater detail with respect to FIGS. 2-5. For example, in some implementations, the cooling system 150 can provide cooling to the vehicle computing system 102. In some implementations, the cooling system 150 can be a liquid cooling system. For example, the liquid cooling system can be configured to provide cooling to the vehicle computing system or other vehicle systems by circulating a liquid coolant to the vehicle systems.

The autonomous vehicle 10 can also include a power conversion system 160. For example, the power conversion system 160 can include one or more power converters which can be used to convert power generated by the autonomous vehicle or power stored in an energy storage device from one type of power to another or from a first voltage to a second voltage. For example, the one or more power converters can be AC to DC, DC to DC, or DC to AC power converters.

In some implementations, the cooling system 150 can be configured to provide cooling to the power conversion system 160. For example, the cooling system 150 can be configured to circulate a coolant, such as a liquid coolant, through a heatsink or other heat-removing device configured to remove heat from the one or more power converters in the power conversion system 160.

The autonomous vehicle 10 can also include an energy storage system 170. For example, an energy storage system 170 can include one or more energy storage devices, such as batteries, capacitors, super-capacitors, or other energy storage devices, which can be used to store energy which can be used by the sensors 101, the vehicle computing system 102, the vehicle controls 107, the power conversion system 160, or other vehicle systems to power the systems and components of the autonomous vehicle 10.

In some implementations, the cooling system 150 can be configured to provide cooling to the energy storage system 170. For example, the cooling system 150 can be configured to circulate a coolant, such as a liquid coolant, through a heatsink or other heat-removing device configured to remove heat from the one or more energy storage devices in the energy storage system 170.

Referring now to FIGS. 2-5, an example cooling system 150 according to example aspects of the present disclosure is depicted. As shown, the cooling system 150 can include a thermal interface 210, a plurality of cooling sources 220-260, and a controller 270.

The thermal interface 210 can be configured to provide cooling to one or more vehicle systems of the autonomous vehicle 10. For example, as shown in FIGS. 2-5, the thermal interface 210 is configured to provide cooling to an AV computing system 102. In other implementations, the thermal interface can be configured to provide cooling to a power conversion system 160, an energy storage system 170, or other vehicle systems of an autonomous vehicle 10.

For example, as shown, the thermal interface 210 can be coupled to the AV computing system 102 or other vehicle system via a coolant supply line 211 and a coolant return line 212. In some implementations, the cooling system 150 can be a liquid cooling system, and a liquid coolant can be circulated to the AV computing system 102 or other vehicle system to provide cooling to the vehicle system. In other cooling systems 150, a gas or other coolant can be used.

The AV computing system 102 or other vehicle system can receive cooling from the thermal interface 210 in order for the AV computing system 102 or other vehicle system to safely operate below a threshold thermal constraint. For example, the AV computing system 102 may have a total cooling parameter, which can be expressed in Watts or Watts at a particular temperature (e.g., degrees C. or F.).

Figure 2:
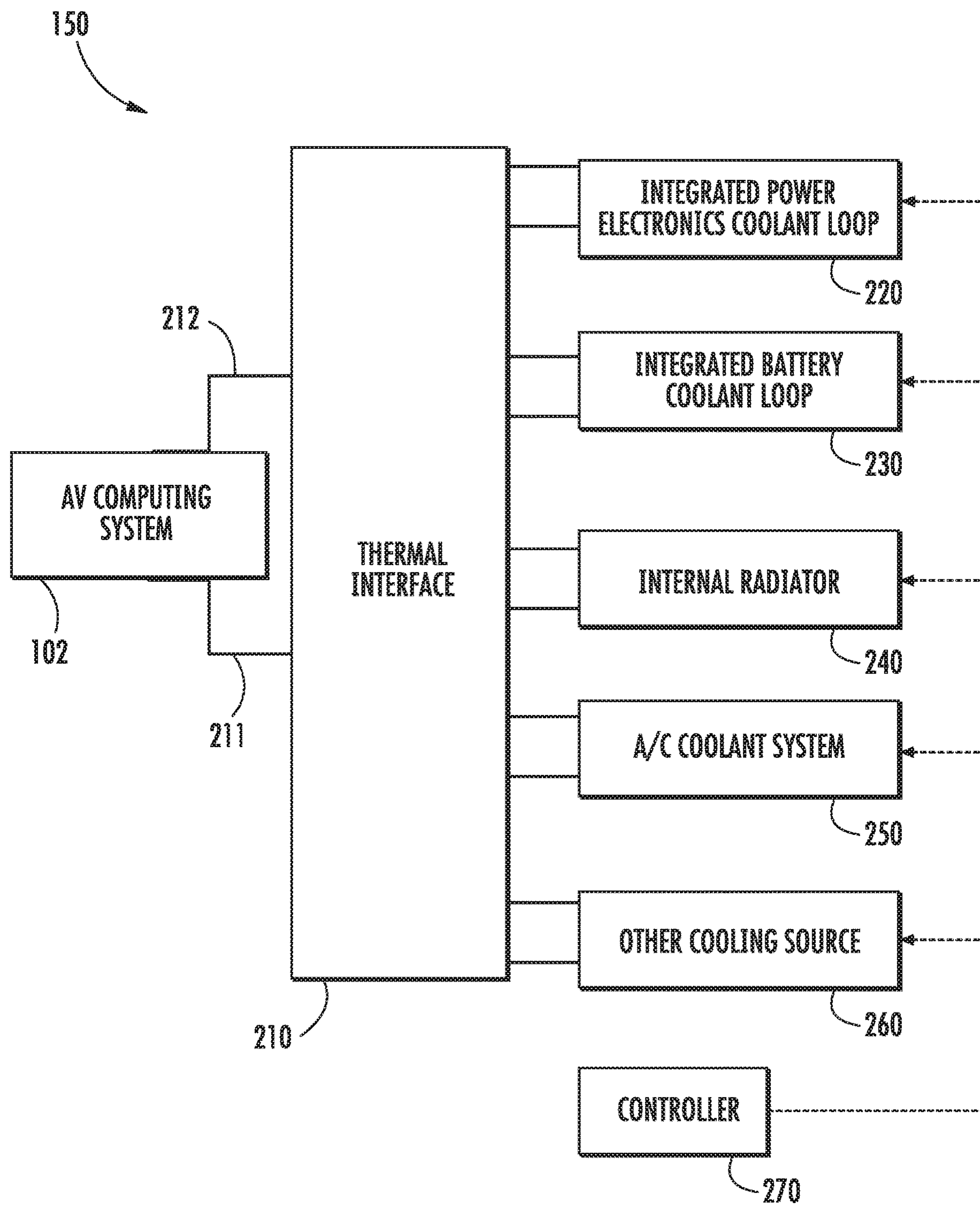
FIG. 2 depicts a block diagram of an example cooling system according to example aspects of the present disclosure.

The thermal interface 210 can further be coupled to the plurality of cooling sources 220-260. As shown in FIG. 2, the plurality of cooling sources 220-260 can include an integrated power electronics coolant loop 220, an integrated battery coolant loop 230, an internal radiator 240, an air-conditioning ("A/C") coolant system 250, or other cooling source 260. As will be described in greater detail with respect to FIGS. 3-5, each cooling source 220-260 can be configured to provide a respective cooling capacity to the thermal interface 210.

For example, in various implementations, each cooling source 220-260 can provide a fixed amount of cooling (e.g., 200 Watts), a range of cooling (e.g., 200-500 Watts), or incremental cooling levels (e.g., 200, 300, 400, 500 Watts). The thermal interface can be configured to receive the respective cooling provided by each of the cooling sources 220-260, and further can provide the respective cooling received by each of the cooling sources to the one or more vehicle systems to meet the total cooling parameter of the one or more vehicle systems. For example, as shown in FIGS. 2-5, the thermal interface 210 can receive the respective cooling from a plurality of the cooling sources 220-260, and further can provide the cooling received from the plurality of cooling sources 220-260 to the AV computing system 102 via the coolant supply line 211. After the coolant has provided cooling to the AV computing system 102, the coolant can then be circulated back to the thermal interface via the coolant return line 212 to receive additional cooling.

In some implementations, the cooling system 150 can include a controller 270 configured to control each cooling source 220-260 to provide a respective cooling to the thermal interface 210 to meet the total cooling parameter for the one or more vehicle systems. In some implementations, the controller 270 can include one or more processors. In some implementations, the controller 270 can further include one or more memory devices. The one or more processors can be any suitable processing device (e.g., a processor core, a microprocessor, an ASIC, a FPGA, a computing device, a microcontroller, etc.) and can be one processor or a plurality of processors that are operatively connected. The one or more memory devices can include one or more non-transitory computer-readable storage mediums, such as RAM, ROM, EEPROM, EPROM, flash memory devices, magnetic disks, etc., and combinations thereof. The one or more memory devices can store data and instructions which can be executed by the one or more processors to cause the controller 270 to perform operations.

Figure 3:
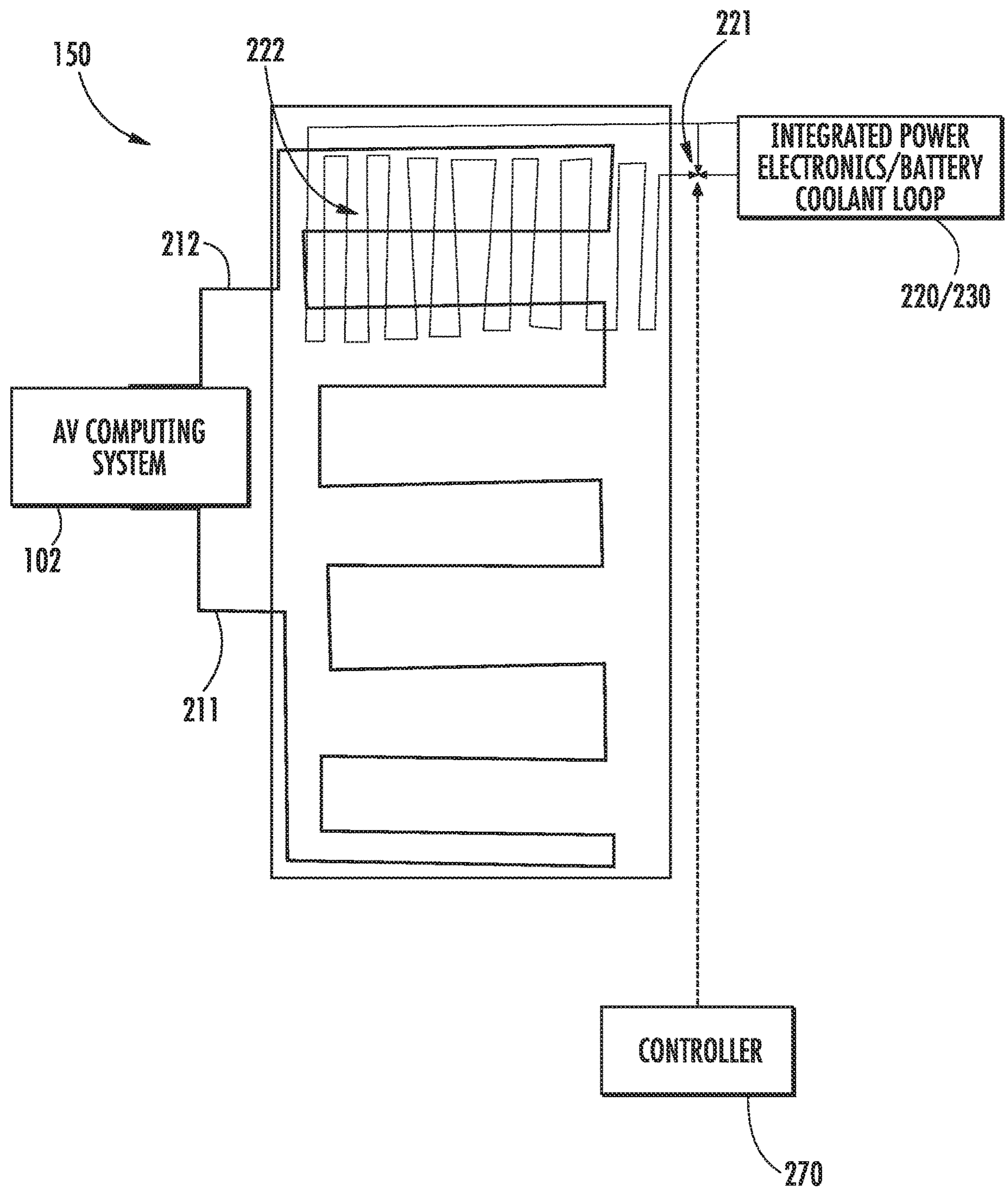
FIG. 3 depicts an example integrated coolant loop of an example cooling system according to example aspects of the present disclosure.

Referring now to FIG. 3, an example cooling system 150 according to example aspects of the present disclosure is depicted showing additional detail for an integrated power electronics coolant loop 220 and/or an integrated battery coolant loop 230. For example, when a vehicle is manufactured, an OEM may integrate a power electronics coolant loop 220 to provide cooling to various power electronics devices of the vehicle. In some implementations, the integrated power electronics coolant loop may have been added to the vehicle by a third-party or after-market installer. Similarly, a battery coolant loop 230 may be integrated by an OEM into a vehicle during manufacturing, such as to provide cooling to batteries in an electric or hybrid-electric vehicle, or may have been added to the vehicle by a third-party or after-market installer.

When a vehicle with such an integrated power electronics coolant loop 220 or integrated battery coolant loop 230 is adapted for autonomous use, in some implementations, the integrated coolant loop 220/230 can be incorporated into a cooling system 150. For example, a bypass valve 221 can be configured to allow coolant from the coolant loops 220/230 to be provided to a heat exchanger 222 of the thermal interface 210. For example, the controller 270 can be configured to control operation of the bypass valve 221 to allow coolant from the integrated coolant loops 220/230 to flow through the heat exchanger 222. The heat exchanger 222 can allow heat to be transferred from coolant flowing through one side of the heat exchanger to the coolant in the integrated coolant loops 220/230. In some implementations, the heat exchanger 222 can be a plate heat exchanger, such as a brazed plate heat exchanger, fused plate heat exchanger, and/or welded plate heat exchanger. In implementations in which a plate heat exchanger is used, the large surface area of the plates can allow for rapid, efficient transfer of heat between coolants flowing on opposite sides of the plates.

The controller 270 can be configured to control operation of the bypass valve 221 to allow or impede the flow of coolant from the integrated coolant loop 220/230 through the heat exchanger 222. In this way, the controller 270 can control the integrated coolant loop 220/230 to provide cooling to the thermal interface 210, which can then provide cooling to one or more vehicle systems, such as an autonomous vehicle computing system 102. In some implementations, the controller 270 can control a setpoint in order to adjust a flow rate of coolant provided by the integrated coolant loop 220/230, such as by incrementally allowing more or less coolant to flow through the heat exchanger 222. In some implementations, the controller 270 can control the bypass valve 221 to an "open" position such that the valve allows a maximum amount of coolant to flow from the integrated coolant loop 220/230 through the heat exchanger 222 or a "closed" position such that the valve does not allow coolant to flow through the heat exchanger 222. In some implementations, the controller 270 can determine whether and how much cooling should be provided by the integrated coolant loop 220/230, and can control the bypass valve 221 accordingly.

An advantage provided by the cooling systems according to example aspects of the present disclosure is that such integrated coolant loops 220/230 can be incorporated into a cooling system 150 in order to take advantage of supplemental cooling capacity that such integrated coolant loops 220/230 may have. For example, during some operating conditions, the power electronics and/or batteries cooled by the integrated coolant loops 220/230 may not require any or all of the cooling capacity available from the coolant loops 220/230. Under such operating conditions, the controller 270 can be configured to control the bypass valve 221 to allow the full or supplemental cooling capacity of the integrated coolant loops 220/230 to provide cooling to one or more vehicle systems of the autonomous vehicle 10.

As shown in FIG. 3, a single integrated coolant loop 220/230 corresponding to either an integrated power electronics coolant loop 220 or integrated battery coolant loop 230 is depicted. However, it should be recognized that in some implementations, an integrated power electronics coolant loop 220 and an integrated battery coolant loop 230 can be included in a cooling system 150. In such an implementation, each respective integrated coolant loop 220/230 can include a respective bypass valve 221 configured to allow the integrated coolant loop 220/230 to circulate coolant through a respective heat exchanger 222. Further, the respective heat exchangers can be serially connected such that coolant flows through a first heat exchanger 222 associated with a first integrated coolant loop 220 before flowing through a second heat exchanger 222 associated with a second integrated coolant loop 230, or vice-versa.

Figure 4:
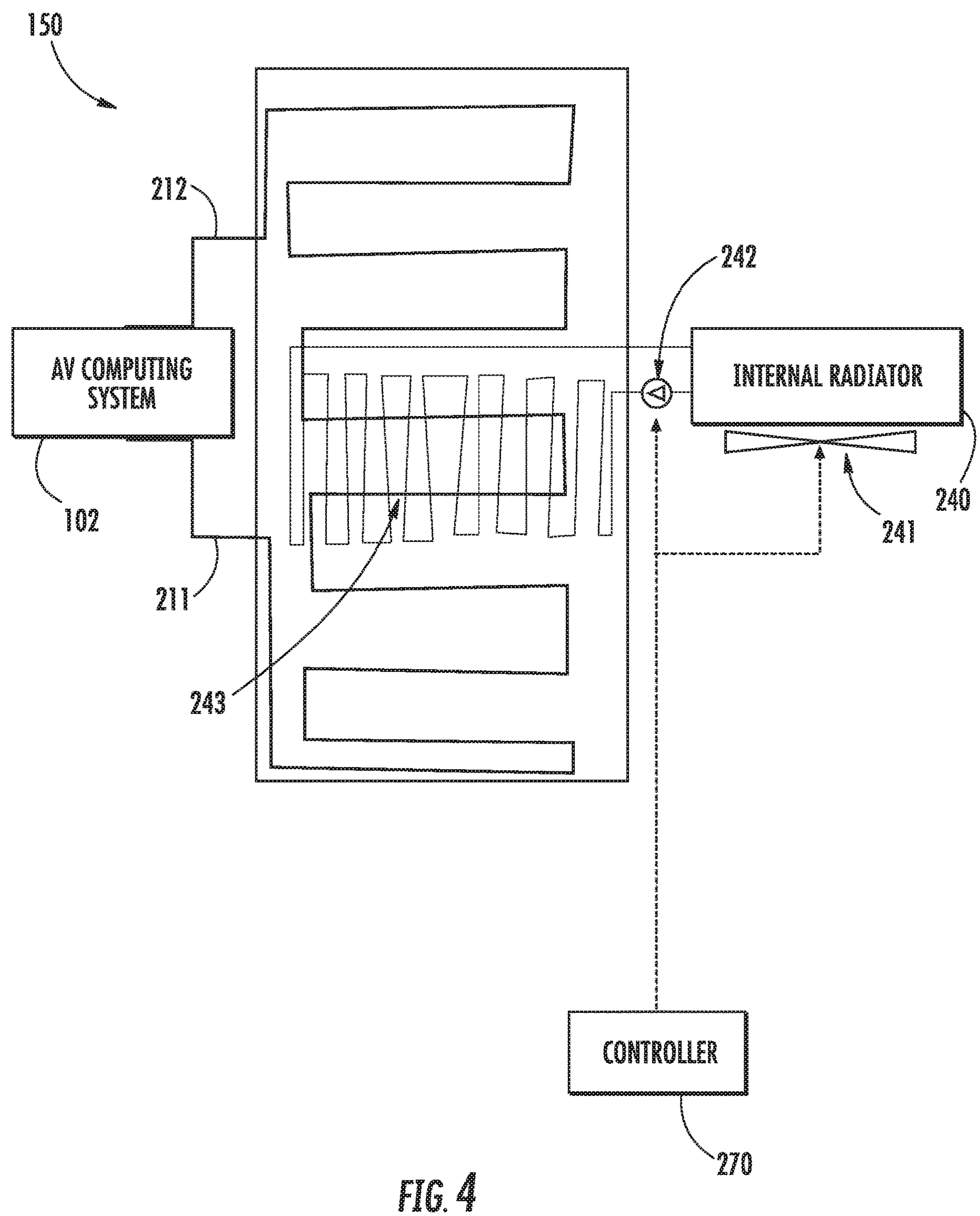
FIG. 4 depicts an example internal radiator coolant loop of an example cooling system according to example aspects of the present disclosure.

Referring now to FIG. 4, an example cooling system 150 according to example aspects of the present disclosure is depicted showing additional detail for an internal radiator coolant loop 240. The internal radiator coolant loop 240 can be, for example, a separate or stand-alone radiator coolant loop configured to provide cooling to the cooling system 150. In some implementations, the internal radiator coolant loop 240 can include one or more coolant loops, such as radiator coils, which can be configured to receive an airflow, such as an ambient airflow, via a fan 241. Heat can be transferred from a coolant, such as a liquid coolant, to the ambient air as the ambient air passes over the one or more radiator coils. In some implementations, a pump 242 can be configured to pump the coolant from the one or more radiator coils to a heat exchanger 243 of the thermal interface 210.

For example, the thermal interface 210 can include a heat exchanger 243 configured to receive cooling from the internal radiator coolant loop 240, such as a plate heat exchanger. The pump 242 can circulate a coolant from the one or more coolant loops through one side of the heat exchanger 243, which can remove heat from the coolant flowing on the other side of the heat exchanger 243. In various implementations, the heat exchanger 243 can be serially connected with other heat exchangers of the thermal interface 210.

In some implementations, the internal radiator coolant loop 240 can be a primary cooling source configured to provide the majority of cooling for the cooling system 150. In other implementations, the internal radiator coolant loop 240 can provide less than a majority of cooling for the cooling system 150.

The controller 270 can be configured to control operation of the fan 241 and pump 242 to circulate a coolant through the internal radiator coolant loop 240. In this way, the controller 270 can control the internal radiator coolant loop 240 to provide cooling to the thermal interface 210, which can then provide cooling to one or more vehicle systems, such as an autonomous vehicle computing system 102. In some implementations, the controller 270 can control a setpoint in order to adjust a flow rate of coolant provided by the internal radiator coolant loop 240, such as by increasing an airflow speed from the fan 241 and/or increasing a flow rate of the pump 242. In some implementations, the controller 270 can control the fan 241 and pump 242 to an "on" mode such that a maximum amount of coolant flows from the internal radiator coolant loop 240 through the heat exchanger 222 or an "off" mode such that the fan 241 and pump 242 do not circulate a coolant or provide an airflow to the one or more coolant loops. In some implementations, the controller 270 can determine whether and how much cooling should be provided by the integrated coolant loop 220/230, and can control the fan 241 and pump 242 accordingly.

Figure 5:
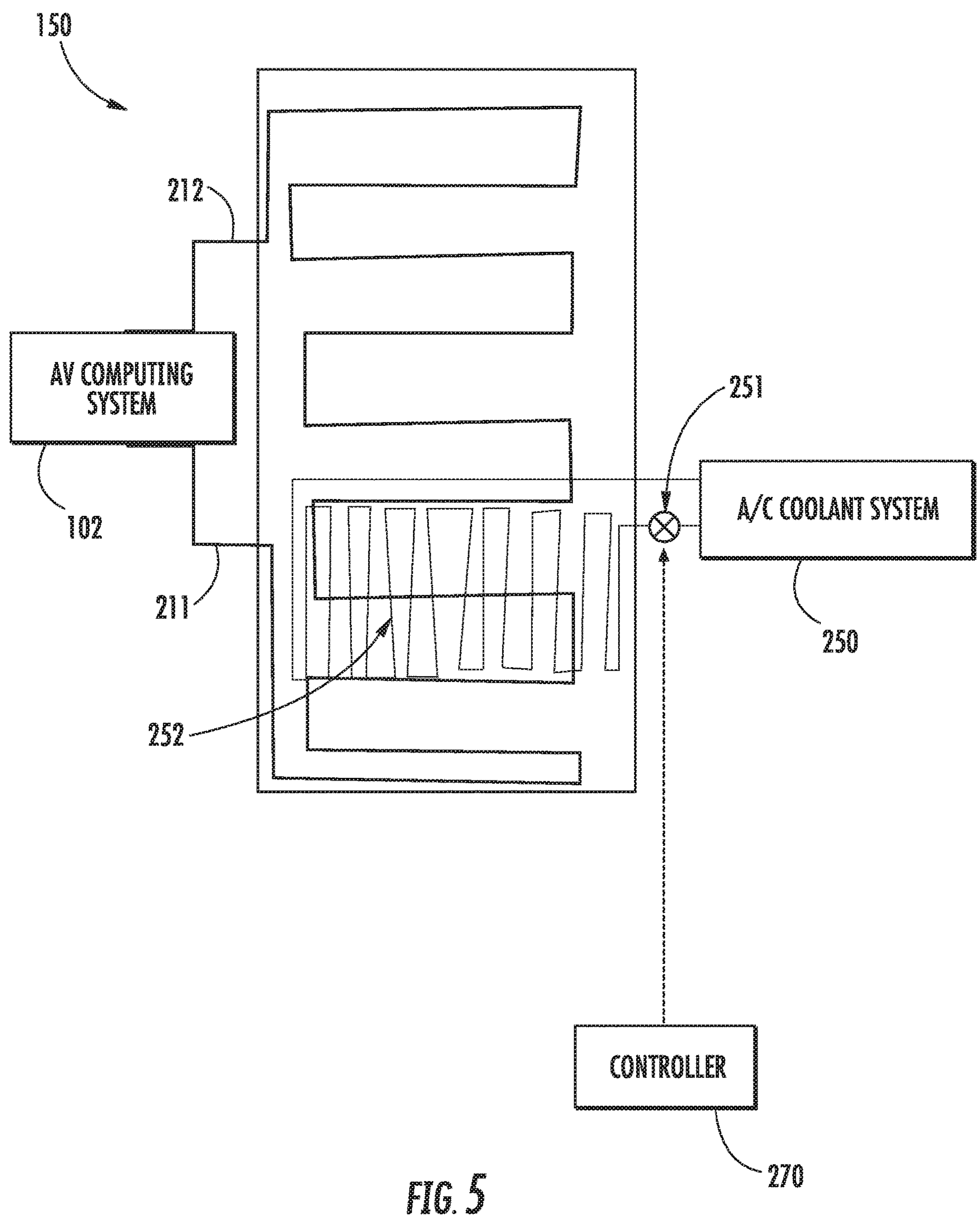
FIG. 5 depicts an example air-conditioning coolant loop of an example cooling system according to example aspects of the present disclosure.

Referring now to FIG. 5, an example cooling system 150 according to example aspects of the present disclosure is depicted showing additional detail for an air-conditioning coolant system 250. For example, an OEM can include an air-conditioning coolant system 250 on a vehicle in order to regulate the temperature inside of the cabin of a vehicle for passenger comfort. The air-conditioning coolant system 250 can be, for example, a refrigeration cycle style air-conditioning coolant system 250, such as a system including a condensing coil (not shown), one or more expansion valves 251, an evaporator coil (not shown), and a compressor (not shown).

The air conditioning coolant system 250 can be coupled to the thermal interface 210 of the cooling system 150 to allow for the air-conditioning coolant system 250 to provide a cooling capacity to the thermal interface 210. For example, in some implementations, the air-conditioning coolant system 250 can include an expansion valve 251 coupled to a heat exchanger 252 of the thermal interface 210. The expansion valve 251 can be operated to allow a pressurized liquid coolant of the air-conditioning coolant system 250 to expand into a cooled vapor that circulates through one side of the heat exchanger 252 to allow heat to be removed from a coolant flowing through the thermal interface 210 through a second side of the heat exchanger 252. The warmed vapor can then be circulated through the air-conditioning coolant system 250 to re-pressurize the liquid to allow for further cooling to be provided.

The controller 270 can be configured to control operation of the expansion valve 251 and other air-conditioning coolant system components in order to allow for the air-conditioning coolant system 250 to provide cooling to thermal interface 210. In some implementations, the controller 270 can control a setpoint of the expansion valve 251 in order to adjust a flow rate of coolant provided by the air-conditioning coolant system 250. In some implementations, the controller 270 can be configured to control the air-conditioning coolant system 250 by communicating with a separate controller (not shown) of the air-conditioning coolant system 250, such as via one or more wired or wireless connections.

In some implementations, the air-conditioning coolant system 250 can be configured to provide a respective cooling to the thermal interface 210 up to a threshold cooling capacity. For example, the air-conditioning coolant system 250 can be operated to provide cooled air to the cabin of the autonomous vehicle 10 for passenger comfort during operation of the autonomous vehicle 10. The amount of cooling needed to sufficiently cool the cabin of the autonomous vehicle 10 (e.g., an amount cooling required to hold the temperature of the cabin at a particular setpoint) can determine a cooling cabin requirement. A threshold cooling capacity can be a supplemental cooling capacity of the air-conditioning coolant system 250 after the cabin cooling requirement has been met by the air-conditioning coolant system 250. For example, the air-conditioning coolant system 250 can be sized to provide sufficient cooling to the cabin of the vehicle 10 in a variety of operating conditions and temperatures. In some operating conditions, the air-conditioning coolant system 250 may have excess or supplemental cooling capacity after meeting the cabin cooling requirement. In some implementations, the controller 270 can control the air-conditioning coolant system 250 to provide cooling to the thermal interface 210 up to the threshold cooling capacity. For example, the air-conditioning coolant system 250 can be controlled to only provide cooling to the thermal interface 210 up to the threshold cooling capacity by the controller 270 operating the expansion valve 251.

In some implementations, the controller 270 can be configured reduce the cabin cooling requirement in order to increase the threshold cooling capacity. For example, in certain situations, the total cooling parameter for the one or more vehicle systems may not be able to be met by the plurality of cooling sources 220-260 with the air-conditioning coolant system 250 only providing cooling up to the threshold cooling capacity. For example, due to high ambient temperatures outside the vehicle, high operating temperatures of the one or more vehicle systems, or the unavailability of one or more of the cooling sources 220-260 (e.g., due to operational issues), the cooling system 150 may be unable to meet the total cooling parameter of the one or more vehicle systems with the air-conditioning coolant system 250 only providing cooling up to the threshold cooling capacity. In such a situation, the controller 270 can be configured to reduce the cabin cooling requirement in order to allow for an increased threshold cooling capacity to be provided to the thermal interface 210. For example, the controller 270 can communicate with or otherwise control the air-conditioning coolant system 250 in order to reduce the cooling provided to the cabin of the autonomous vehicle 10, such as by adjusting a temperature setpoint on a temporary basis, in order to allow for additional cooling to be provided to the one or more vehicle systems.

Referring generally to FIGS. 2-5, the thermal interface 210 can include a plurality of heat exchangers 222/243/252. For example, each cooling source 220-260 can be coupled to a respective heat exchanger 222/243/252 to provide cooling to the thermal interface 210. In some implementations, the plurality of heat exchangers 222/243/252 can be serially connected in a single coolant loop, and a coolant can be pumped through the plurality of serially connected heat exchangers 222/243/252, thereby allowing each cooling source 220-260 to provide a respective cooling to the coolant as it flows through the associated heat exchanger 222/243/252.

An advantage provided by a cooling system 150 according to example aspects of the present disclosure is the ability to tailor the cooling system 150 to the cooling needs of a particular vehicle 10 using a variety of cooling sources 220-260 available to the vehicle 10. For example, different OEMs may include different cooling sources 220-260 on a vehicle 10, which can be incorporated into the cooling system 150 by coupling the cooling sources 220-260 to the thermal interface 210. For example, the cooling sources 220-260 can be coupled either directly or indirectly to respective heat exchangers 222/243/252 of the thermal interface 210. Further, different vehicles 10 which are adapted for autonomous use may have different cooling requirements due to the type of vehicle, the operational constraints of the vehicle, and/or the conditions in which the vehicle 10 operates (e.g., climate/weather conditions).

Additionally, the individual cooling sources 220-260 in the cooling system 150 can be controlled by the controller 270 to meet the cooling needs of the vehicle 10. Should a particular cooling source 220-260 experience operational issues preventing the cooling source 220-260 from providing cooling to the cooling system 150, the other cooling sources 220-260 can be used to provide cooling to one or more vehicle systems via the cooling system 150. Additionally, should a particular cooling source 220-260 need to be replaced, the cooling source 220-260 can simply be decoupled from the thermal interface 210 and the replacement cooling source can be installed. This can allow for incremental upgrades to be performed on the cooling system 150, such as if the cooling requirements for one or more vehicle systems change due to upgrades of the vehicle systems.

Figure 6:
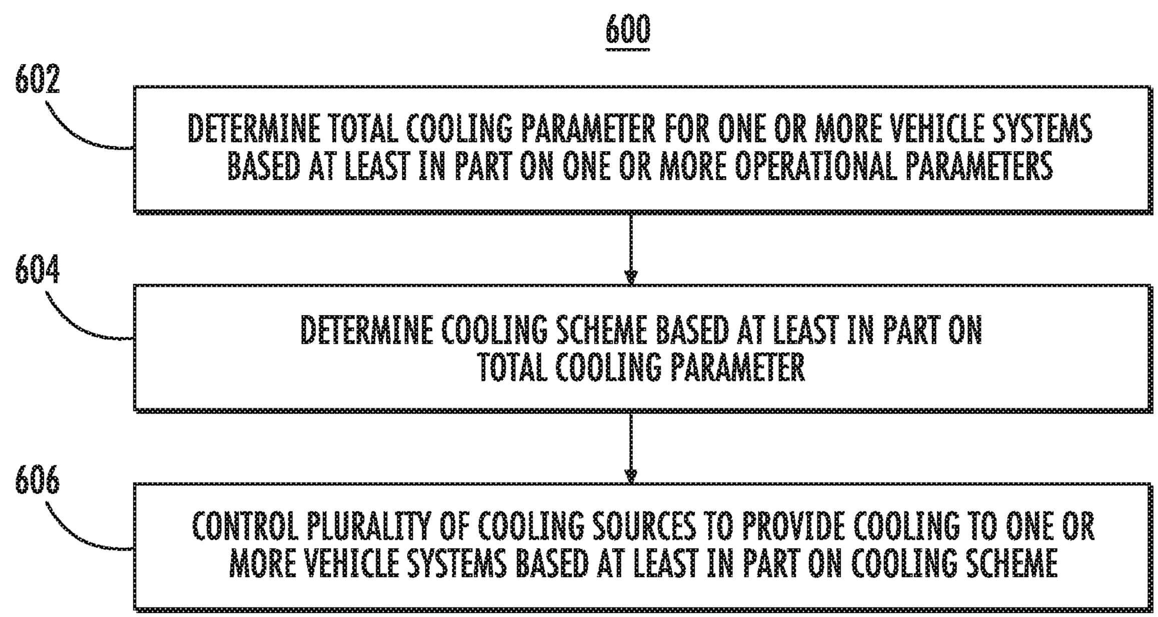
FIG. 6 depicts a flow diagram of an example method for providing cooling to one or more vehicle systems of an autonomous vehicle according to example aspects of the present disclosure.

Referring now to FIG. 6, an example method (600) to provide cooling to one or more vehicle systems of an autonomous vehicle according to example aspects of the present disclosure is depicted. Although FIG. 6 depicts steps performed in a particular order for purposes of illustration and discussion, the methods of the present disclosure are not limited to the particularly illustrated order or arrangement. The various steps of method (600) can be omitted, rearranged, combined, and/or adapted in various ways without deviating from the scope of the present disclosure. The method (600) can be implemented by a controller, such as a controller 270 comprising one or more processors.

At (602), the method (600) can include determining a total cooling parameter for the one or more vehicle systems based at least in part on one or more operational parameters. For example, a controller 270 can be configured to receive signals, measurements, and/or data indicative of the one or more operational parameters. The one or more operational parameters can include, for example, an energy usage of the one or more vehicle systems (e.g., a power consumption of the one or more vehicle systems), an ambient temperature external to the autonomous vehicle, an operating temperature for the one or more vehicle systems, an inlet and/or outlet temperature of coolant from one or more cooling sources, and/or an inlet and/or outlet temperature of coolant provided to the one or more vehicle systems. The controller 270 can be configured to determine the total cooling parameter for the one or more vehicle systems by, for example, determining the amount of cooling needed to operate the vehicle system(s) below a threshold temperature (e.g., Watts of cooling), determining a desired outlet temperature of coolant provided to the one vehicle system(s), or determining a desired operational temperature of the one or more vehicle system(s). For example, in some implementations, the controller 270 can determine a total amount of Watts of cooling to be provided by the cooling system 150 (e.g., 2000 Watts of cooling for a computing system), while in other implementations, the controller 270 can determine a temperature setpoint to maintain. As examples, the controller 270 can increase or decrease the amount of cooling provided by the cooling system 150 based on the operational temperature of the one or more vehicle systems or an outlet temperature of coolant provided to the one or more vehicle systems (e.g., outlet temperature of coolant maintained at 60° C.). For example, the controller 270 can iteratively increase or decrease the cooling provided by one or more cooling sources 220-260 to maintain a temperature setpoint of the vehicle system(s) and/or coolant.

At (604), the method (600) can include determining a cooling scheme for the cooling system based at least in part on the total cooling parameter. For example, in some implementations the cooling scheme can be indicative of which cooling sources 220-260 are to provide cooling and or an amount of cooling to be provided by each respective cooling source 220-260. For example, a cooling scheme can indicate that an internal radiator coolant loop 240 should be operated at a first setpoint (e.g., expressed in Watts, percentage, power level, power factor, or other setpoint), while an air-conditioning coolant system 250 should be operated at a second setpoint (e.g., expressed in Watts, percentage, power level, power factor, or other setpoint). In some implementations, the cooling scheme can be determined via a feedback loop, such as on an iterative basis. For example, a temperature measurement can indicate that more or less cooling is needed, and the controller 270 can determine an incremental increase or decrease in a cooling source 220-260 can be provided to meet the total cooling parameter. In some implementations, the cooling scheme can be determined via a lookup table, such as by looking up which cooling sources 220-260 to use and/or amounts of cooling to provide at a particular temperature, energy usage, or other operational parameter.

In some implementations, the controller 270 can be configured to determine the cooling scheme based at least in part on an energy efficiency of one or more of the cooling sources. For example, in some implementations, a cost and/or efficiency function can be used to express the relative cost and/or efficiency of providing cooling from a particular cooling source 220-260 (e.g., X dollars per watt at Y degrees C.). In some implementations, the controller can be configured to determine the cooling scheme in order to increase an overall efficiency, maximize an overall efficiency, reduce an expense, or minimize an expense of a cooling system 150 to meet a total cooling parameter. For example, in some implementations, an air-conditioning coolant system 250 may have a higher efficiency (e.g., less operational cost per unit of cooling, less waste per unit of cooling, etc.) than an integrated battery coolant loop 230. The controller 270 can be configured to select the air-conditioning coolant system 250 to provide cooling at a higher priority than the integrated battery coolant loop 230 to meet the total cooling parameter of the one or more vehicle systems.

In some implementations, the controller 270 can be configured to determine the cooling scheme based at least in part on an expected service life for one or more of the cooling sources 220-260 and/or the one or more vehicle systems. For example, in some implementations, a first cooling source 220-260 may have a greater number of components, more expensive components, more easily worn out components, a lower mean-time before failure, and/or other expected service life variation as compared to a second cooling source 220-260. For example, an air-conditioning coolant system 250 may have an increased number of components, an increased replacement cost, and/or a lower mean time between failures than an internal radiator coolant system 240. The controller 270 can be configured to select the internal radiator coolant system 240 at a higher priority than the air-conditioning coolant system 250 to meet the total cooling parameter of the one or more vehicle systems. For example, the internal radiator coolant system 240 can be controlled to provide cooling up to a threshold (e.g., a maximum amount of cooling), and the air-conditioning coolant system 250 can be controlled to provide incremental cooling above the threshold. In some implementations, the controller 270 can be configured to determine the cooling scheme in order to extend an expected service life of one or more of the cooling sources 220-260. For example, the controller 270 can be configured to select a particular cooling source 220-260 at a lower priority in order to reduce the wear and tear on the cooling source 220-260, thereby increasing the expected service life of the cooling source 220-260.

Similarly, the one or more vehicle systems may have an expected service life that is dependent upon an operating temperature. For example, a computing system 102 may have a first expected service life when operated consistently at a first temperature (e.g., 10 years at 60° C.) and a second expected service life when operated consistently at a second temperature (e.g., five years at 70° C.). The controller 270 can be configured to control the plurality of cooling sources 220-260 to provide cooling to the one or more vehicle systems in order to manage the operating temperature of the one or more vehicle systems. For example, the controller 270 can control the plurality of cooling sources 220-260 to allow for the vehicle system to be operated at a particular operating temperature (e.g., 60° C. for the computing system). In this way, the controller 270 can control the operating temperature to manage, and in particular, increase the expected service life of the one or more vehicle systems.

At (606), the method (600) can include controlling the plurality of cooling sources to provide cooling to the one or more vehicle systems based at least in part on the cooling scheme. For example, the controller 270 can be configured to operate or otherwise control a bypass valve 221, an expansion valve 251, a pump 242, a fan 241, or other component of a cooling source 220-260 in order to cause the cooling source 220-260 to provide a cooling capacity to the thermal interface 210. Further, the controller 270 can be configured to control the amount of cooling provided by a cooling source 220-260. For example, the controller 270 can be configured to control how fast a pump 242 circulates coolant through the thermal interface 210 and/or through a cooling source 220-260, how fast a fan 241 blows, how far open a bypass valve 221 or expansion valve 251 is opened, and/or perform any other control action needed to control a cooling source 220-260 to provide cooling and/or a cooling amount.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A cooling system for an autonomous vehicle; comprising:

a thermal interface configured to provide cooling to one or more vehicle systems of the autonomous vehicle;

a plurality of cooling sources coupled to the thermal interface; each cooling source configured to provide a respective cooling capacity to the thermal interface, each of the plurality of cooling sources comprising a coolant loop or an air conditioning coolant system; and a controller configured to control each cooling source to provide a respective cooling to the thermal interface to meet a total cooling parameter for the one or more vehicle systems;

wherein the thermal interface is configured to receive the respective cooling provided by each of the cooling sources; and wherein the thermal interface is further configured to provide the respective cooling received by each of the cooling sources to the one or more vehicle systems to meet the total cooling parameter.

2. The cooling system of claim 1; wherein the cooling system further comprises a liquid cooling system;

wherein the liquid cooling system is configured to provide cooling to the one or more vehicle systems by circulating a liquid coolant to the one or more vehicle systems.

3. The cooling system of claim 1, wherein at least one of the cooling sources in the plurality comprises an integrated power electronics coolant loop configured to provide cooling to one or more power electronic devices of the autonomous vehicle;

wherein the integrated power electronics coolant loop comprises a bypass valve;

wherein the bypass valve is configured to allow or impede the flow of coolant to the thermal interface; and wherein the controller is configured to control the integrated power electronics coolant loop to provide a respective cooling to the thermal interface by controlling operation of the bypass valve to allow a full or supplemental cooling capacity of the integrated power electronics coolant loop to provide cooling to the thermal interface.

4. The cooling system of claim 1, wherein at least one of the cooling sources in the plurality comprises an integrated battery coolant loop configured to provide cooling to one or more batteries of the autonomous vehicle;

wherein the integrated battery coolant loop comprises a bypass valve;

wherein the bypass valve is configured to allow or impede the flow of coolant to the thermal interface; and wherein the controller is configured to control the integrated battery coolant loop to provide a respective cooling to the thermal interface by controlling operation of the bypass valve to allow a full or supplemental cooling capacity of the integrated power electronics coolant loop to provide cooling to the thermal interface.

5. The cooling system of claim 1, wherein at least one of the cooling sources in the plurality comprises an internal radiator coolant loop, comprising:

one or more coolant loops configured to circulate a coolant;

a pump configured to circulate the coolant through the one or more coolant loops; and a fan configured to provide an airflow to the one or more coolant loops to remove heat from the coolant in the one or more coolant loops;

wherein the controller is configured to control the internal radiator coolant loop to provide a respective cooling to the thermal interface by controlling operation of the pump and the fan.

6. The cooling system of claim 1, wherein at least one of the cooling sources in the plurality comprises an air-conditioning coolant system configured to provide a cooled airflow to a cabin of the autonomous vehicle;

wherein the air-conditioning coolant system comprises an expansion valve; and wherein the controller is configured to control the air-conditioning coolant system to provide a respective cooling to the thermal interface by controlling operation of the expansion valve.

7. The cooling system of claim 6, wherein the controller is configured to control the air-conditioning coolant system to provide a respective cooling to the thermal interface up to a threshold cooling capacity;

wherein the threshold cooling capacity comprises a supplemental cooling capacity of the air-conditioning coolant system after a cabin cooling requirement has been met by the air-conditioning coolant system.

8. The cooling system of claim 7, wherein controller is further configured to reduce the cabin cooling requirement in order to increase the threshold cooling capacity.

9. The cooling system of claim 1, wherein the thermal interface comprises a plurality of heat exchangers; wherein each cooling source is coupled to a respective heat exchanger; wherein each cooling source is configured to provide a respective cooling capacity to the thermal interface via the respective heat exchanger for the cooling source.

10. The cooling system of claim 9, wherein each heat exchanger comprises a plate heat exchanger.

11. The cooling system of claim 1, wherein the one or more vehicle systems comprise one or more of a vehicle computing system, a power conversion system, or an energy storage system.

12. A method of providing cooling to one or more vehicle systems of an autonomous vehicle, comprising:

determining, by a controller comprising one or more processors, a total cooling parameter for the one or more vehicle systems based at least in part on one or more operational parameters;

determining, by the controller, a cooling scheme for a cooling system comprising a plurality of cooling sources and a thermal interface based at least in part on the total cooling parameter, each of the plurality of cooling sources comprising a coolant loop or an air conditioning coolant system; and controlling, by the controller, the plurality of cooling sources to provide cooling to the thermal interface and the one or more vehicle systems based at least in part on the cooling scheme.

13. The method of claim 12, wherein the thermal interface comprises a plurality of heat exchangers, wherein each cooling source is coupled to a respective heat exchanger, wherein each cooling source is configured to provide a respective cooling capacity to the thermal interface via the respective heat exchanger for the cooling source.

14. The method of claim 12, wherein the one or more operational parameters comprise one or more of: an energy usage for the one or more vehicle systems, an ambient temperature external to the autonomous vehicle, an operating temperature for the one or more vehicle systems, an inlet or outlet temperature of a coolant from one or more cooling sources, or an inlet or outlet temperature of a coolant provided to the one or more vehicle systems.

15. The method of claim 12, wherein the controller is configured to determine the cooling scheme for the cooling system based at least in part on an energy efficiency of one or more of the cooling sources.

16. The method of claim 12, wherein the controller is configured to determine the cooling scheme for the cooling system based at least in part on an expected service life of one or more of the cooling sources or the one or more vehicle systems.

17. The method of claim 12, wherein controlling, by the controller, the plurality of cooling sources to provide cooling to the one or more vehicle systems comprises, for each cooling source, controlling one or more of a bypass valve, an expansion valve, a pump; and a fan.

18. The method of claim 12, wherein the one or more vehicle systems comprise one or more of a vehicle computing system, a power conversion system, and an energy storage system.

19. An autonomous vehicle, comprising:

one or more vehicle systems; and a cooling system, comprising:

a thermal interface configured to provide cooling to the one or more vehicle systems, the thermal interface comprising a plurality of heat exchangers;

a plurality of cooling sources, each cooling source comprising a coolant loop or an air conditioning coolant system coupled to a respective heat exchanger of the thermal interface; each cooling source configured to provide a respective cooling capacity to the thermal interface; and a controller comprising one or more processors and one or more memory devices, the one or more memory devices storing instructions that when executed by the one or more processors cause the controller to perform operations, the operations comprising:

determining a total cooling parameter for the one or more vehicle systems based at least in part on one or more operational parameters;

determining a cooling scheme for the plurality of cooling sources based at least in part on the total cooling parameter; and controlling the plurality of cooling sources to provide cooling to the thermal interface based at least in part on the cooling scheme;

wherein the one or more vehicle systems comprise one or more of: a vehicle computing system, a power conversion system, or an energy storage system; and wherein the plurality of cooling sources comprises a plurality of: an integrated power electronics coolant loop, an integrated battery coolant loop, an internal radiator coolant loop, or an air-conditioning coolant system.

20. The autonomous vehicle of claim 19, wherein the one or more operational parameters comprise one or more of: an energy usage for the one or more vehicle systems, an ambient temperature external to the autonomous vehicle; an operating temperature for the one or more vehicle systems, an inlet or outlet temperature of coolant from one or more cooling sources, or an inlet or outlet temperature of coolant provided to the one or more vehicle systems.

* * * * *